(12) United States Patent
Chamat

(10) Patent No.: US 7,178,642 B1
(45) Date of Patent: Feb. 20, 2007

(54) DRUM BRAKE

(75) Inventor: Djamel Chamat, South Bend, IN (US)

(73) Assignee: Robert Bosch GmbH, Stuttgardt (DE)

( * ) Notice: Subject to any disclaimer, the term of this patent is extended or adjusted under 35 U.S.C. 154(b) by 120 days.

(21) Appl. No.: 10/905,789

(22) Filed: Jan. 20, 2005

(51) Int. Cl.
F16D 65/56 (2006.01)

(52) U.S. Cl. .................................. 188/79.52

(58) Field of Classification Search ........ 188/325–331, 188/79.52
See application file for complete search history.

(56) References Cited

U.S. PATENT DOCUMENTS

| | | | |
|---|---|---|---|
| 3,204,729 A | 9/1965 | Barnes | |
| 4,220,227 A | 9/1980 | Kluger | |
| 4,223,765 A | 9/1980 | Turak | |
| 4,385,681 A * | 5/1983 | Conrad et al. ........... | 188/79.52 |
| 4,390,086 A * | 6/1983 | Conrad ................... | 188/79.52 |
| 4,502,573 A | 3/1985 | Carre et al. | |
| 4,502,574 A | 3/1985 | Spaargaren | |
| 4,503,949 A * | 3/1985 | Carre et al. ............. | 188/79.64 |
| 4,706,784 A * | 11/1987 | Shellhause .............. | 188/79.52 |
| 4,938,320 A | 7/1990 | Hyde et al. | |
| 6,196,360 B1 * | 3/2001 | Iizuka et al. ............. | 188/79.52 |
| 6,328,141 B1 * | 12/2001 | Asai et al. ............... | 188/79.52 |
| 6,508,339 B2 * | 1/2003 | Asai et al. ............... | 188/79.52 |
| 6,691,838 B2 * | 2/2004 | Wang ....................... | 188/79.51 |
| 6,918,468 B2 * | 7/2005 | Girini et al. ............. | 188/79.52 |
| 2003/0226729 A1 * | 12/2003 | Ohnishi et al. ............ | 188/342 |

\* cited by examiner

Primary Examiner—Christopher P. Schwartz
(74) Attorney, Agent, or Firm—Leo H. McCormick, Jr.; Sarah Taylor

(57) ABSTRACT

An adjuster for a strut located between first and second friction members for a drum brake. The strut has a shaft that is free to rotate in a first end member and threaded into the second end member. A lever pivots during a brake application and engages a ratchet wheel on the shaft to rotates the shaft and expand the strut to maintain a minimum running clearance with respect to a rotatable member. A bi-metal coil strip that is fixed to the strut has a free end that is aligned with the lever arm. The strip responds to a predetermined temperature by moving the lever arm away from the ratchet wheel such movement of the lever does not rotate the ratchet wheel and expand the strut. Thus, on termination of a brake application a current running clearance is sustained without being affected by the predetermined temperature.

3 Claims, 2 Drawing Sheets

DRUM BRAKE

This invention relates to an adjuster arrangement for a drum brake that establishes a running clearance between a friction surface and a drum and has a thermal responsive member that reacts to a predetermine temperature to terminate an adjustment function of the running clearance when a predetermined temperature occurs within the drum.

BACKGROUND OF THE INVENTION

Non-servo drum brakes as disclosed in U.S. Pat. Nos. 4,101,011; 4,220,227 and 4,223,765 have an extendable strut located between a first web of a first brake shoe and a second web of a second brake shoe to control a running clearance between the brake shoes and a drum. A pawl located on the first brake shoe has an arm that engages a ratchet wheel on the extendable strut to provide for an extension of the extendable strut when the running clearance reaches a maximum width. This type of structure for adjusting the running clearance functions in an adequate manner in a drum brake during a normal braking application. However, it has been observed in a brake system that includes a traction control and/or a sway control system it is possible to over adjust the running clearance. On investigation, it was found that a cause of the over adjust is due to the level of the actuation force acting on the first and second webs to move the first and second brake shoes into engagement with the drum actually compressed the brake pads and/or distorted the structural components sufficiently to indicate a greater linear distance than actually needed to move from a position of rest to an actuation position. Thus on termination of the actuation force, when the running clearance is over adjusted, it is possible that the brake shoes in an extreme situation may actually remain engaged with the drum. In such an extreme situation, the brake shoes cause a drag that remains until wear has removed lining material from the brake shoes.

Over adjustment has been addressed in the following U.S. Pat. Nos. 4,390,086; and 6,508,339 through the insertion of an in line bi-metal strip that causes the strut to expand when a predetermined temperature is experienced by the drum brake. This arrangement functions in an adequate manner, however since forces are always carried through the bi-metal strip and the physical dimensions of the bi-metal strip must be considered even though an actual need may only occur periodically in the operation of a drum brake.

SUMMARY OF THE INVENTION

A primary object of the present invention is to provide a drum brake having an extendable strut that is adjustable to control running clearance with means to prevent over adjustment when the drum brake experiences a predetermined temperature.

According to this invention, the drum brake has a hydraulic actuator that engages a first web of a first brake shoe and a second web of a second brake shoe. An extendible member that is located between the first web and the second web is extendable to define a minimum running clearance in the rest position between friction pads associated with the first and second brake shoes and the rotatable member (brake drum). A lever arm that is mounted on the first web engages a tooth on a ratchet wheel on a shaft of the extendable member. A resilient member that extends between the lever to the second web urges the first and second webs into engagement with the hydraulic actuator. When an operator desires to effect a brake application, pressurized hydraulic fluid is supplied as an input to the hydraulic actuator for developing an actuation force to move the first and second brake shoes from a rest position to a position where the corresponding friction pads thereon engage a rotatable member to effect the brake application. As the first web moves through the running clearance, the lever arm pivots with respect to the first web. When the running clearance reaches a predetermined maximum gap, the lever pivots sufficiently to move a tooth on the ratchet wheel through an arc equal to the width of the tooth and correspondingly increase the length of the extendible member as the shaft moves out of threads on an end member of the strut secured to the first web. By extending the length of the strut the first and second shoes are moves closer to the rotatable member to thereby establish a minimum width for the running clearance between the friction pads and the rotatable member. On engagement of the friction pads with the rotatable member thermal energy is created that causes thermal expansion of the components and notably the rotatable member such that the web needs to move a distance to effect a brake application that includes the running clearance and the thermal expansion in order to effect a brake application. When the temperature resulting from the thermal energy reaches a predetermined level, the lever will have been rotated such that the face on the arm moves a tooth on the ratchet wheel to extend the width of the strut however, a coil strip of a bi-metal strip has a first end attached to an end member fixed to the second web and a second end that is located in a perpendicular alignment with the arm on the lever. When the bi-metal strip experiences a predetermined environmental temperature, the free end engages the arm on the lever and prevents engagement with a tooth on the ratchet wheel. Without engagement of the lever arm with a tooth on the ratchet wheel no adjustment occurs during the brake application and as a result a current running clearance as before the brake application is maintained and unaffected by the generated thermal energy during the brake application.

An advantage of this invention resides in a drum brake wherein the generation of thermal energy during a brake application does not affect the maintenance of a minimum running clearance between friction pads and a rotatable brake drum.

DETAILED DESCRIPTION

Figure 1:
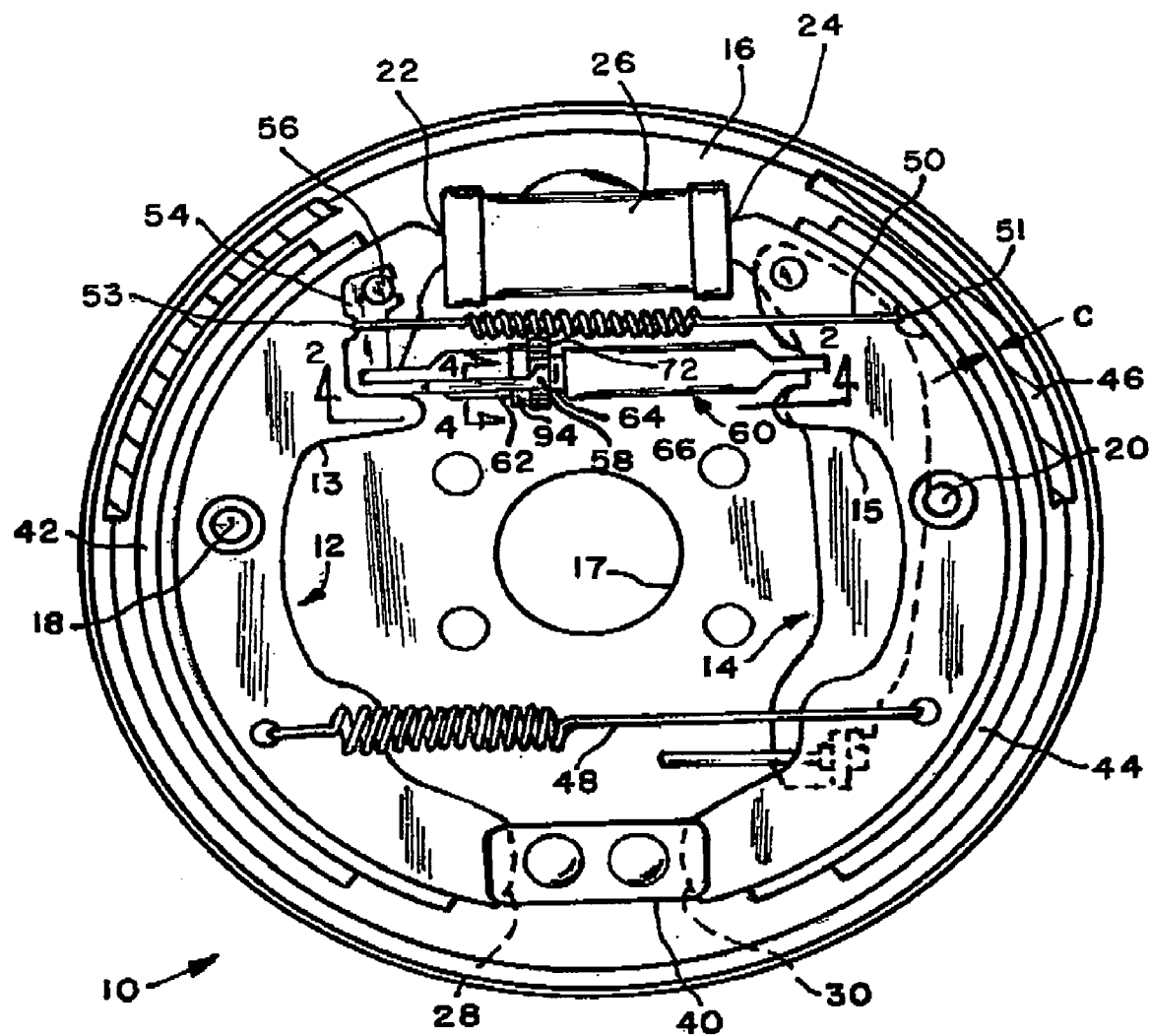
FIG. 1 is a schematic illustration of a drum brake having an adjustable strut with a coil strip of bi-metal material to prevent adjustment resulting from thermal expansion in according to the principals of the present invention.

The drum brake 10 as shown in FIG. 1 includes a backing plate 16 with an opening 17 for receiving an axle shaft of a vehicle. A hydraulic actuator assembly 26 is located at the top of the backing plate 16 and an anchor block 40 is aligned on the bottom of the backing plate 16. First 12 and second 14 brake shoes are retained on the backing plate 16 by first 18 and second 20 pins connected to a backing plate 16. Brake shoe 12 has a first end 22 and brake shoe 14 has a first end 24 that are respectively connected to a hydraulic actuator assembly 26. Further, brake shoe 12 has a second end 28 and brake shoes 14 has a second end 30 that are respectively connected to anchor block 40 attached to the backing plate 16. A strut 60 of a type illustrated in U.S. Pat. Nos. 4,223,765 and 4,502,574 is located between the webs 13 and 15 of brake shoes 12 and 14 respectively, to maintain a predetermined running clearance "C" between first 42 and second 44 friction pads and a drum 46. A first spring 48 is connected to webs 13 and 15 for respectively urging the second ends 28, 30 of the first 12 and second 14 brake shoes toward the anchor post 40. A second spring 50 has a first end 51 connected to web 15 and a second end 53 connected to an indexing lever 54 retained on web 13 to urge the first ends 22, 24 into engagement with the hydraulic actuator 26 and a first end member 62 and a second end member 66 of strut 60 into respective engagement with webs 13 and 15. When an operator desires to effect a brake application, an input in the form of pressurized fluid supplied to hydraulic actuator 26 to develop an actuation force that acts on and moves the first ends 22, 24 of webs 13 and 15 outward through a running clearance "C" to bring friction pads 42, 44 into engagement with drum 46 to effect a brake application.

Figure 4:
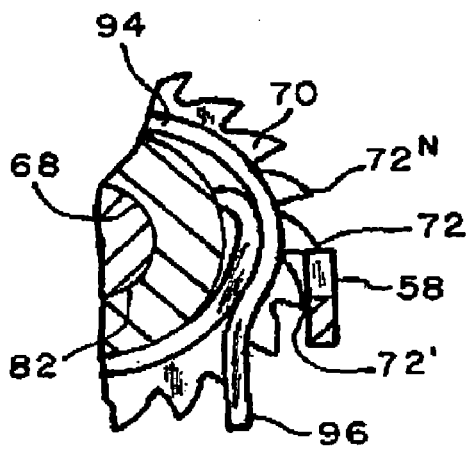
FIG. 4 is a sectional view taken along lines 4—4 of FIG. 1 showing the relationship between a pawl on an indexing lever, a ratchet wheel and a temperature responsive coil strip.
Figure 5:
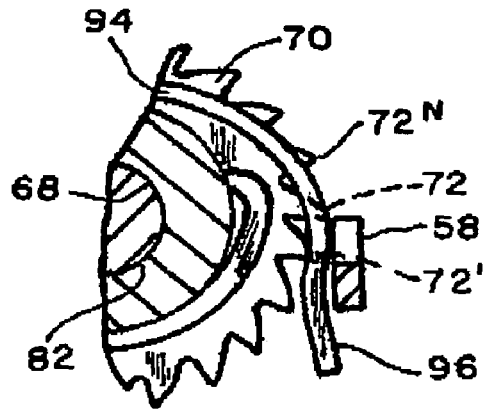
FIG. 5 is a sectional view of FIG. 4 showing the pawl moved away from teeth on a ratchet wheel by a free end of the coil strip as a result of a predetermined temperature action on the coil strip.

The strut 60 is an extendable member and defined by a first end member 62 that is separated by a rotatable stem member or shaft 64 from a second end member 66. The shaft 64 has a smooth or first cylindrical surface 68 retained in an axial bore 82 in the first end member 62, a second cylindrical surface or ratchet wheel 70 with a series of teeth 72, 72' . . . 72" thereon, see FIGS. 1, 4 and 5, located between said smooth surface 68 and a third cylindrical surface 74 with first threads 76 thereon. Threads 76 are mated with corresponding second threads 78 located in the second end member 66.

The indexing lever 54 that is pivotally attached to web 13 of brake shoe 12 by pin 56 has an arm or pawl 58 which cooperates with the teeth 72, 72' . . . 72" on ratchet wheel 70 to incrementally rotate shaft 64 to extend the length of the strut 60 and thereby adjust and maintain a desired clearance "C" between the friction pads 42, 44 and brake drum 46.

Figure 2:
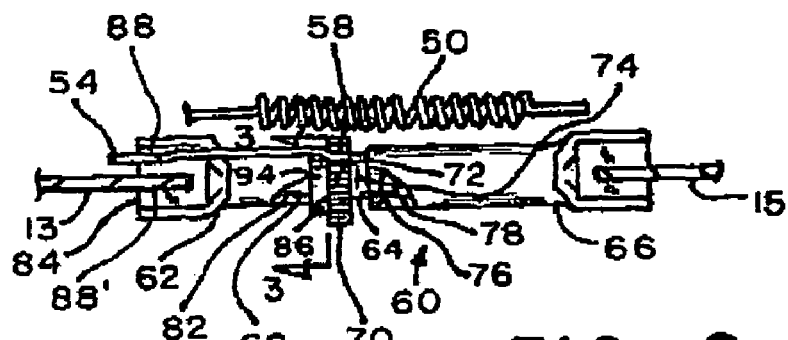
FIG. 2 is a sectional view taken along lines 2—2 of FIG. 1.
Figure 3:
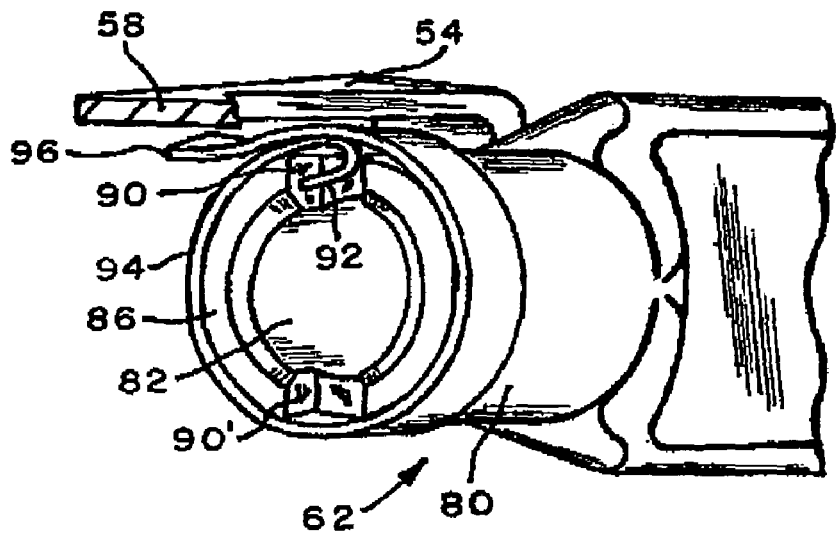
FIG. 3 is a perspective illustration taken along lines 3—3 of FIG. 2.

The first end member 62 is defined by a cylindrical body 80, having a first end 84 and a second end 86 with an axial bore 82, see FIGS. 2 and 3, that extends from the second end 86 toward the first end 84, radial slots 88, 88' adjacent the first end 84 and radial slots 90, 90' adjacent the second end 86. Radial slots 88 receives indexing lever 54 and radial slot 88' receives web 13, see FIGS. 3 and 4, to align the radial slots 90, 90' in a plane that is parallel with the web 13 to receive end 92 of coil strip 94. Coil strip 94 is made of bi-metal material and end 92 retained in slot 90 while the coil surrounds the cylindrical body 80 such that a free or second end 96 extends along a tangent of the cylindrical body 80 and the second end 96 is located in a plane that is perpendicular to pawl 58 of indexing lever 54, see FIGS. 3 and 4. The first or cylindrical surface 68 of shaft 64 is retained in an axial bore 82 in the first end member 62 such that the radial surface on ratchet wheel 70 engages the second end 86 of end member 62 to axially retain the first end 92 in slot 90 with out applying any axial force thereon.

OPERATION OF THE DRUM BRAKE

When an operator desires to effect a brake application, pressurized fluid is supplied to hydraulic actuator 26 that acts on pistons therein to develop an actuation force that is transmitted into the first end 22 of web 13 and into the first end 24 of web 15 to move the first 13 and second 15 webs through the running clearance "C" and bring friction pads 42 and 44 into engagement with drum 46 to effect a brake application. Movement of web 15 toward the drum 46 causes spring 50 to expands and pivot indexing lever 54 on pin 56 such that the pawl 58 moves with respect to tooth 72 of the plurality of teeth 72, 72' . . . 72" on the ratchet wheel 70 on rotatable shaft 64 of strut 32. On termination of the pressurized fluid being supplied to actuator 26, spring 48 pulls on webs 13 and 15 and spring 50 pulls on web 13 and indexing lever 54 to move the friction surface out of engagement with drum 46. When the running clearance is at a maximum, spring 50 rotates indexing lever 64 sufficiently for pawl 58 to rotate tooth 72 a distance equal to the width of the tooth 72 and turn threads 76 out of threads 78 in the second end member 66 that is held stationary by web 15 to extend the length of strut 32 and thereby re-define a minimum running clearance "C". On return of webs 13 and 15 to a rest position pawl 58 moves to engage a subsequent tooth 72' on ratchet wheel 70 to continue the adjustment feature for the life of the first 42 and second 44 friction pads.

During a brake application, when friction pads 42 and 44 engage the rotatable member or drum 46 thermal energy is created and to increase the environmental temperature experienced by the drum brake 10. Should a brake application continue for a relatively long time period, the environmental temperature within a drum brake 10 can increase to a point wherein thermal expansion of the components occurs and in particular the size of the drum brake 46. An increase in the size of the drum brake 46 requires the actuator 26 to move the friction pads 42 and 44 a greater distance to effect a brake application such that spring 50 pivots indexing lever 54 to move pawl 58 and correspondingly rotate ratchet wheel 70 through engagement with tooth 72. To prevent the pawl 58 from engaging the tooth 72, the bi-metal coil strip 94 responds to the environmental temperature experienced by the drum brake 10 by un-coiling such that free end 96 engages pawl 58 to prevent engagement with tooth 72 and adjustment resulting from thermal expansion, see FIG. 5. Pawl 58 is held away from tooth 72 and a same running clearance as prior to the predetermined environmental temperature being developed in the drum brake 10 is maintained. Thus, through this invention, adjustment is solely based on the action of the bi-metal coil strip 94 responding to environmental temperature and no force relationship developed during a brake application is involved in the adjustment function.

What is claimed is:

1. A thermal responsive adjuster for a drum brake wherein a hydraulic actuator engages a first web of a first brake shoe and a second web of a second brake shoe to move first and second friction pads into engagement with a drum to effect a brake application, an extendable strut member having a first end member connected to said first web and a second end member connected said second web with a shaft having a first end retained in the first end member and a second end that is connected through threads to the second end member to maintain a running clearance in a rest position between first and second friction pads on said first and second brake shoe and the drum, a lever arm that is mounted on said first web and engages a ratchet wheel on the shaft and a resilient member that extends between said lever arm to the second web to urge said first and second webs into engagement with the hydraulic actuator, said lever arm pivoting with respect to said first web during a brake application and on the occurrence of a predetermined maximum running clearance engaging a tooth on the ratchet wheel to rotate the shaft with respect to said second end member and extend the threaded connection there between and correspondingly a dimension between said first and second end members to re-establish a minimum width for the running clearance on return of said first and second webs to said rest position, said first and second friction pads on engagement with the drum generating thermal energy such that the drum expands and as a result said lever arm pivots on the first web as the first and second brake pads move into engagement with the drum, the improvement wherein said first end member is characterized by a cylindrical body having a having a first end and a second with an axial bore that extends from said first end toward said second end, said first end having first and second radial slots and said second end having third and fourth radial slots that extend from the axial bore, said first and second radial slots being received by the first web to locate said third and fourth radial slots in a vertical plane with respect to the first web, and wherein said third radial slot receives a first end of a coil strip of bi-metal material to locate a second end of the coil strip that is free to move along a tangent with respect to said cylindrical body and in a plane perpendicular to the lever arm, said coil strip responding to thermal energy generated during a brake application and to a predetermined temperature created by the thermal energy by uncoiling such that said second end is brought into engagement with the lever arm and thereafter moves the lever arm out of engagement with said ratchet wheel to prevent said lever arm from thereafter rotating said ratchet wheel during movement of the first web and second web to effect a brake application such that on termination of the brake application a same running clearance is maintained between the first and second brake shoes and the drum as prior to the development of the predetermined temperature.

2. The thermal responsive adjuster for a drum brake as recited in claim 1 wherein said ratchet wheel engages said second end of said first end member to retain said first end of said coil strip in said third slot without placing an axial restraint on said coil strip such that functional uncoiling of said coil strip in moving said lever arm is solely dependent on temperature change experienced by said drum brake.

3. The thermal responsive adjuster for a drum brake as recited in claim 2 wherein said coil strip of bi-material is selected such that a force resulting from a change in physical dimension only needs to move the lever arm and does not need to overcome any brake actuation force.

* * * * *